INVENTOR.
ALBERT T. BUTTRISS
CLARENCE R. VANNIEL

United States Patent Office 3,606,649
Patented Sept. 21, 1971

3,606,649
FASTENING DEVICE
Albert T. Buttriss, Westlake, and Clarence R. Van Niel, North Olmsted, Ohio, assignors to Eaton Yale & Towne, Inc., Cleveland, Ohio
Continuation of application Ser. No. 733,570, May 3, 1968. This application Feb. 24, 1970, Ser. No. 13,731
Int. Cl. A44b 21/00
U.S. Cl. 24—735A                                29 Claims

ABSTRACT OF THE DISCLOSURE

A fastening device for welded securement with a support member having a body made from a metallic material, and a tip-like projection made from the material of the body and extending outwardly therefrom for securement by electrical welding to the support member. In one form, the body is of a partially closed construction, such as an inverted cup-like shape, having an exterior flange construction and/or an interior lug construction for interior or exterior mounting of other mating attachment fasteners to the support member. In other forms, the body has a generally open, such as generally U-shaped or generally inverted U-shaped, constructions having one or more of the tip-like projections for welded securement to the support member.

This application is a continuation of the co-pending application to Albert T. Buttriss and Clarence R. Van Niel, Ser. No. 733,570, filed May 31, 1968, and now abandoned.

BACKGROUND OF THE INVENTION

The present invention relates to fastening devices, and more particularly relates to a novel construction for metallic fastening devices which can be secured, such as by electric welding or the like, to a support member. The fastening devices of the invention are particularly useful in application for mounting other mating attachment fasteners, such as by snap-action, rotary or slide action, to a support member, such as a panel.

Heretofore, it has been known to provide various welded or soldered securements, such as by rivets, weld studs or the like, for the attachment of various types of components. In such cases, the securement has generally been achieved by welding the entire exposed surface of the rivet or stud to the material of the work piece which is not entirely satisfactory for many applications. In many applications where decorative or other special surface finishes are required, such prior weld-type devices have a tendency to blemish or otherwise impair the quality of the surface finish. In addition, such prior devices often require the use of auxiliary parts to complete the installation and in many cases are difficult and relatively time consuming to install, particularly under various operating and environmental conditions.

Typical of heretofore known types of welded securements are disclosed in U.S. Pats. Nos. 2,174,678, 2,327,-924 and 3,235,929.

SUMMARY OF THE INVENTION

A fastening device for welded securement to a support member comprising a body made from a metallic material, and at least one tip-like projection extending outwardly from the body adapted for welded securement to the support member. In one form, the body has an inverted, hollow generally cup-shaped construction defined by a base and an endless side wall, the tip-like projection is formed from and depends downwardly and generally centrally from the base, and the base is angularly inclined in a direction away from the tip-like projection to insure a good welded securement with the support member. The body is non-circular, such as oblate, in transverse cross section to prevent rotation when mounting with other mating attachment fasteners. A flange means extends outwardly from the side wall adapted for overlying interlocking engagement with such mating attachment fasteners. In other forms, the body is of a generally U-shaped or inverted generally U-shaped construction defined by base or bridge portions, each of which has leg and flange portions extending downwardly or upwardly therefrom, with the base or flange portions having one or more tip-like projections for welded securement with the support member.

By the foregoing arrangement and accompanying drawings, it will be seen that the present invention provides a novel construction for a weld-type fastener which can be quickly and easily installed in a fraction of a second by commercially available weld equipment, such as capacitor-discharge welding equipment, for high speed assembly line operations. By the fastening devices of the present invention, the securement can be made to a support member without the use of holes in the support member and in a manner so as not to blemish or otherwise impair the surface quality of the finish. Furthermore, by the present invention the alignment of the fastening devices can be accurately controlled and the welded securement in many cases has high strength characteristics, such as in tensile, which is often greater than that of the support member or the fastener itself. Accordingly, efforts to remove the fastener will often destroy the panel or fastener before the welded securement is caused to break. In addition, the fastener devices of the invention can be economically produced with high uniformity so that they may be readily employed for mounting other mating types of attachment fasteners to the panel without the use of auxiliary parts.

DESCRIPTION OF THE PREFERRED EMBODIMENTS

Figure 1:
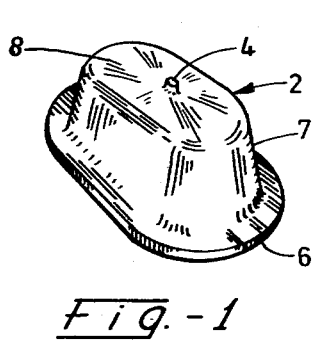
FIG. 1 is a generally perspective view showing one form of the fastening device made in accordance with the invention.
Figures 2, 3:
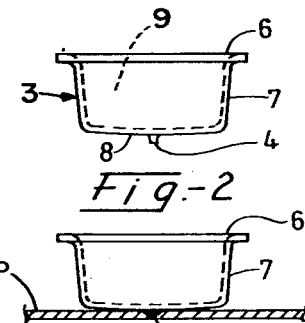
FIG. 2 is a side elevation view of the fastening device shown in FIG. 1.
FIG. 3 is an end view of the fastening device shown in FIG. 2.
Figures 4, 5:
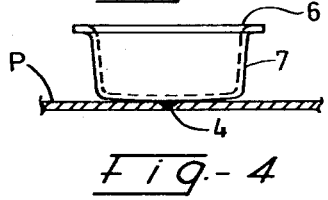
FIG. 4 is a fragmentary, side elevation view, partly in section, showing the fastening device of FIG. 1 in welded secured relation on a support member.
FIG. 5 is a fragmentary, end view, partially in section, of the installation shown in FIG. 4.

Referring now again to the drawings and in particular to FIGS. 1 to 5 thereof, there is illustrated one form of the weld-type fastening device, designated generally at 2, for electrical securement, such as by capacitance welding, to a support member P. In the form shown, the device 2 preferably includes a generally hat or T-cup shaped body 3 having a generally frusto-conical configuration, in elevation. In the invention, the body 3 is made from a metallic material having good weldability characteristics. The body 3 includes and is defined by a resilient endless side wall defined by upwardly and outwardly inclined planar side portions 5 and oppositely disposed generally arcuate inclined end portions 7. The side 5 and end portions 7 of the side wall are made integral with and extend angularly upwardly and outwardly from a bottom or base 8 so as to define a recess opening 9 interiorly thereof. The base 8, in the form shown, is preferably angularly inclined downwardly and outwardly in a direction away from the geometric center of the device to provide a slight clearance with the panel P to insure a good welded securement therewith, as best seen in FIG. 4.

To provide for ready attachment of the device 2 with a mating attachment fastener, the upper marginal edge of the side wall preferably includes an endless outwardly projecting integral flange 6 which has a generally oblate shape in top plan. By this arrangement, the flange 6 coacts with the side wall to provide an overlying construction for mounting a rotary or slide action type attachment fastener on the support member P, as will hereinafter be more fully described.

In the form shown, the base 8 is provided on its under surface with a downwardly extending and centrally oriented protrusion or projecting tip 4 which is formed from the material of the base. The tip 4 extends beyond the lowermost extremity of the base 8 and is preferably tapered downwardly into a sharp point. The tip 4 is adapted to be secured by welding to the material of the panel P in an area immediately adjacent the tip for positive securement of the device to the panel.

Figure 6:
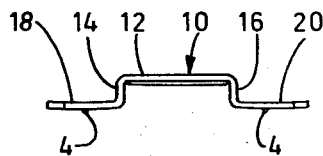
FIG. 6 is a side elevation view of another modified form of the fastening device of the invention.
Figure 7:
FIG. 7 is a top plan view of the fastening device shown in FIG. 6.

In FIGS. 6 and 7 there is illustrated another form of the fastening device, designated generally at 10, including a metallic body having a generally inverted U-shaped construction. In this form, the body includes a bridge portion 12 having a generally concave or arcuate shape in transverse cross section to enhance the strength characteristics of the device. The bridge portion 12 is bent downwardly adjacent its opposed ends to provide a pair of spaced, oppositely disposed generally vertically oriented legs 14 and 16. The legs are bent outwardly adjacent their ends to provide a pair of laterally outwardly extending flanges 18 and 20 adapted for supporting engagement with the confronting side of the panel. As shown, each flange is provided with an integral downwardly extending and centrally oriented tip 4 of the type aforementioned. By this arrangement, a dual weldable construction is provided adjacent the opposed ends of the device to enhance the holding power in the installed position thereof.

Figure 8:
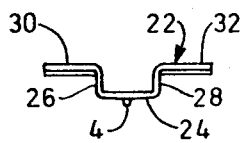
FIG. 8 is a side elevation view of a further form of the fastening device of the invention.
Figure 9:
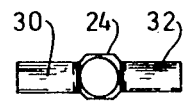
FIG. 9 is a top plan view of the fastening device shown in FIG. 8.

In FIGS. 8 and 9 there is illustrated another form of the fastening device, designated generally at 22, which is generally similar to that shown in FIGS. 6 and 7, except that the device has a generally U-shaped body defined by a base 24 having a generally polygonal, such as hexagonal, shape in top plan, as seen in FIG. 9. In this form, a pair of spaced, oppositely disposed legs 26 and 28 extend generally vertically upwardly from the base 24 and are bent outwardly adjacent their ends to provide a pair of laterally extending flanges 30 and 32. The flanges are preferably concave or arcuate in transverse cross section to enhance the strength characteristics of the device and to facilitate attachment there with to other mating attachment fasteners. As shown, the base 24 is provided with the aforementioned type of weld tip 4 for securement to a support panel.

Figures 10, 11:
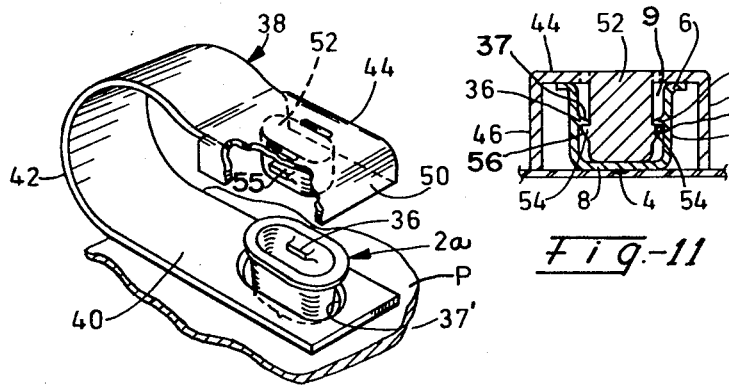
FIG. 10 is a fragmentary, generally perspective view showing another form of the fastening device in position ready for mounting a mating attachment fastener to a support member.
FIG. 11 is a fragmentary, vertical section view of the fastening assembly shown in FIG. 10.
Figure 12:
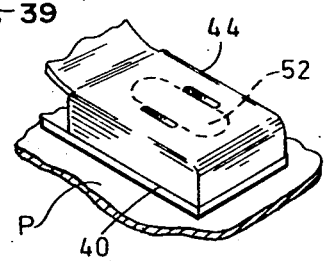
FIG. 12 is a fragmentary, generally perspective view on an enlarged scale showing the assembly of FIG. 10 in the final installed position.

In FIGS. 10 and 12 there is illustrated a modified form of the fastening device, designated generally at 2a, which is generally similar to that of FIGS. 1 to 5 for assembly with a mating attachment fastener 38. In this form, the device 2a is provided on the interior of the side wall with a pair of spaced, oppositely disposed inwardly projecting lugs 36 adapted for overlying camming and interlocking coacting engagement with corresponding parts of the attachment fastener 38. The lugs 36 are preferably of a polygonal, such as triangular, shape having inclined upper surfaces 37 and generally planar under surfaces 39 for snap-coacting engagement with the attachment fastener 38.

In this form, the attachment fastener 38 is of a clip-like construction having a generally U-shaped configuration made from a resilient, flexible material having a pair of resilient legs 40 and 44 which extend outwardly from a curved bight portion 42. The leg 40 is adapted to be mounted in engaged relation against one side of the support panel P and has a non-circular, such as oblate, opening 37' adjacent one end thereof adapted to receive the body of the fastener 2a therethrough. The other leg 44 is provided adjacent its free end with a box-like enclosure construction defined by a pair of spaced, downwardly extending side walls 46 and 48 which are joined together and closed at one end by a curved terminal end wall 50. The side 46 and 48 and end 50 walls are coextensive in length so as to be seated flush with the lower leg 40 in the installed position, as seen in FIG. 12.

In the embodiment shown, a plug-like member 52 extends generally vertically downwardly from the upper leg 44 and in spaced, generally centered relation with respect to the side 46 and 48 and end 50 walls which define the box-like enclosure. The member 52 is preferably of an elongated, hollow construction conforming in transverse shape generally to the corresponding transverse shape of the recess opening 9 in the fastener device 2a. The member 52 is foreshortened in length as compared to the length of the side walls 46 and 48 (FIG. 11) and has a transverse width less than that of the recess opening 9. In this form, the member 52 is provided with a pair of integral, outwardly extending lugs 54 having a generally polygonal, such as triangular, shape configuration having planar upper surfaces 55 and inclined lower surfaces 56 for snap-coacting interlocking engagement with the corresponding surfaces of the lugs 36 on the fastener device 2a. The fastener 38 may be a plastic material in which case the member 52 can be either solid or hollow. If the fastener is metal, the member 52 is preferably hollow and formed from the material of leg 44.

In a typical application of this form of the fastening assembly, the fastener 2a may be inserted through the opening 37' in the leg 40 of the attachment fastener 38 and into engagement with the confronting surface of the support panel P, as shown in FIG. 10. The projecting tip 4 may then be welded, such as by commercially available automatic weld equipment, to the material of the panel which also may melt the material of the panel in the area immediately beneath the tip to provide a weld generally comparable in strength or even greater than that of the panel or fastener itself. Thus secured, the other resilient leg 44 may then be passed downwardly so as to insert the plug-like member 52 into the recess opening 9 in the fastener device 2a. During this movement, the projecting lugs 36 cam over the corresponding outwardly projecting lugs 54 on the member 52 so that the material of the side wall of the fastener 2a is resiliently deformed outwardly until the lugs 36 snap in and over the lugs 54 whereupon the material of the fastener 2a returns to its initial shape due to the resiliency of the construction. In this position, the member 52 is seated against the confronting upper surface of the base 8 of the device 2a with the endless flange 6 disposed in resilient bearing engagement with the confronting under surface of the leg 44 interiorly of the side walls 46 and 48 and end wall 50 of the box-like enclosure which is seated flush against the confronting upper surface of the other leg 40. By this arrangement, the attachment fastener 38 is securely mounted on the support panel P with a high holding power and without the possibility of rotation in such installed position.

Figure 13:
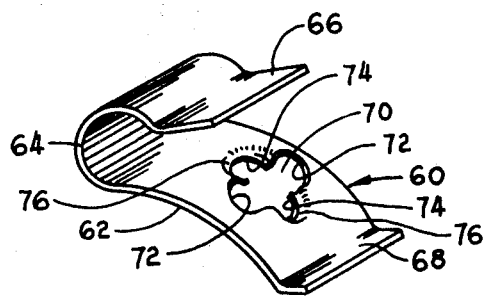
FIG. 13 is a generally perspective view of another form of a mating attachment fastener which can be employed in the invention.
Figure 14:
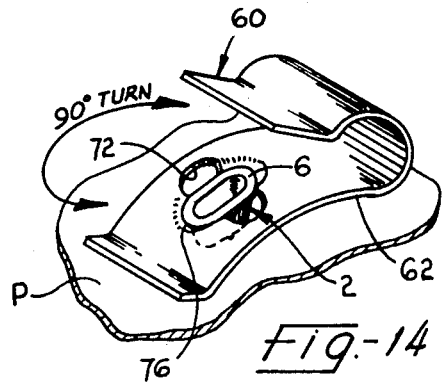
FIG. 14 is a fragmentary, generally perspective view of the mating attachment clip of FIG. 13 mounted on a panel by means of the fastening device of FIGS. 1 to 5.

In FIGS. 13 and 14 there is illustrated one type of application of the fastener 2 of FIGS. 1 to 5 for rotary installation with another type of attachment fastener, designated generally at 60. As best seen in FIG. 13, the fastener 60 is of a generally U-shaped construction defined by a pair of resilient legs 62 and 66 which extend outwardly from a curved bight portion 64. The leg 62 is of a generally arch shape adapted for engagement against one side of the support panel P and it terminates at one end in an outwardly and upwardly extending generally planar flange 68. The leg 62 is provided with a generally centrally disposed non-circular, such as cruciform, opening defined by a first pair of spaced, oppositely disposed arcuate slits 72 and a second pair of spaced, oppositely disposed arcuate slits 74 disposed at a right angle with respect to the first set of slits 72. The maximum transverse dimension between the slits 72 is greater than the corresponding maximum transverse dimension defined by the endless flange 6 of the fastener 2. The other pair of slits 74 are preferably crimped downwardly and outwardly adjacent their interior marginal edges to provide seat-like supporting shoulders 76. The maximum transverse dimension between the shoulders 76 is less than the corresponding maximum transverse dimension of the endless flange 6 of the fastener to provide a seat-like support for the flange 6 of the fastener 2 in the installed position therewith with the attachment fastener 60. The angular inclination of the shoulders 76 generally conforms to the shape of the confronting under surface of the flange 6 to resiliently hold the attachment fastener 60 in snap-acting interlocking coating engagement with the fastener device 2.

In a typical application of the embodiment shown, the fastener device 2 is weldably secured to the support panel P in the manner as aforesaid. Thus installed, the attachment fastener 60 is assembled by moving the cruciform opening defined by the slits 72 over the flange 6 of the fastener 2. Since this defines the major axis of the cruciform opening, the flange is enabled to be received freely through the opening, whereupon, the attachment device 60 is turned a fractional amount, such as 90° or a quarter-turn, so as to bring the flange 6 into overlying and snap-acting interlocking engagement with the shoulders 76 defined by the slits 74. Thus installed, the attachment fastener 60 may be readily employed for mounting other types of articles, such as moldings, trim strips or the like, to the support panel.

Figure 15:
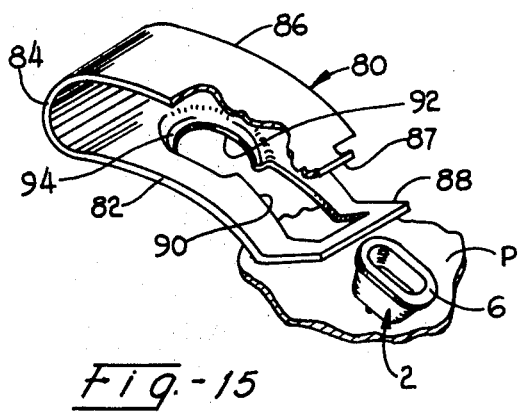
FIG. 15 is a generally perspective view of another type of mating attachment fastener which can be employed in the invention.
Figure 16:
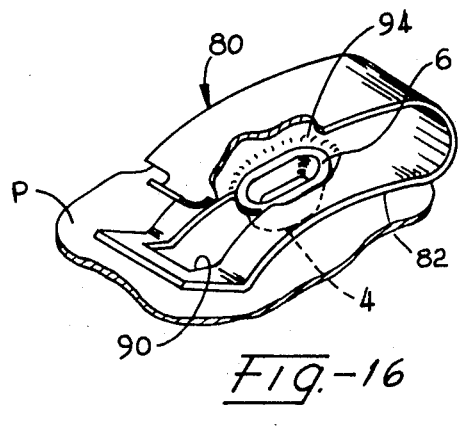
FIG. 16 is a fragmentary, generally perspective view showing the mating attachment clip of FIG. 15 mounted on a panel by means of the fastening device of FIGS. 1 to 5.

In FIGS. 15 and 16 there is shown another application of the fastening device to FIGS. 1 to 5 for use with another form of an attachment fastener, designated generally at 80. In this form, the fastener 80 includes a generally U-shaped body having a pair of spaced, oppositely disposed resilient legs 82 and 86 extending outwardly from a curved bight portion 84. The leg 82 acts as a base and is generally arched for coacting engagement with the confronting surface of the panel P. The leg 82 terminates at its free end in an upwardly and outwardly extending flange portion 88. In the form shown, a generally keyhole shaped slot is provided in the lower leg 82 and the flange portion 88. As shown, the slot includes a generally enlarged polygonal portion 90 which opens onto a non-circular portion 92 formed in the leg 82. The enlarged portion 90 progressively diminishes in width from the flange portion 88 toward its juncture with the non-circular portion 92. Preferably, the portion 92 has an oblate shape generally conforming to that of the body of the fastener device 2. The transverse dimensions of the enlarged portion 90 are preferably greater than the maximum transverse dimensions of the body of the fastener 2 while the opening 92 is slightly greater than the corresponding dimensions of the body of the fastener 2. The opening 92 is provided with a downwardly and inwardly crimped marginal edge, as at 94, which provides a seat-like shoulder for supporting the endless flange 6 of the fastening device 2 thereon. The upper leg 86 is provided adjacent its free end with an upwardly bent tongue 87 adapted for underlying interlocking coacting engagement with the confronting marginal edge defined by the enlarged opening 90 in the flange portion 88 of the leg 82 for holding the upper leg 86 in locked position with respect to the lower leg 82 in the installed position thereof.

In a typical application of the assembly shown in FIGS. 15 and 16, the fastening device 2 is weldably secured to the panel P as by means of the tip-like projection 4, as aforesaid. Thus secured, the attachment fastener 80 is assembled by sliding the leg 82 toward the fastener device 2 so that the device is freely received through the enlarged opening 90 in the leg 82 and flange portion 88. The attachment device 80 is slid further until the body of the fastening device 2 is received through the oblate opening 92 in the leg 82 and with the flange 6 of the device 2 disposed in overlapping coacting engagement with the shoulder 94 of the opening 92. This sliding action has a tendency to resiliently draw the leg 82 toward the confronting surface of the panel P so as to lock the attachment device 80 on the support panel P, as seen in FIG. 16. Thus assembled, the upper leg 86 may then be attached to the lower leg via the tongue 87 for attachment of a suitable article to the panel.

Figures 17, 18, 19:
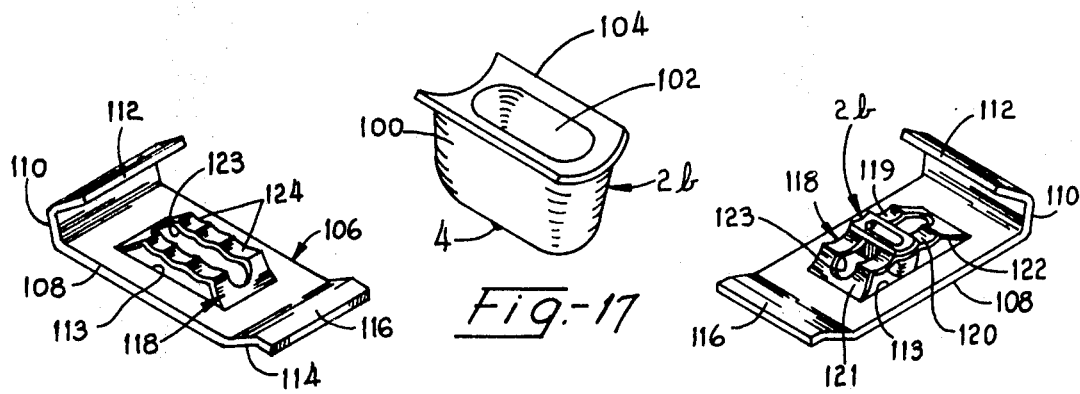
FIG. 17 is a generally perspective view of a further modified form of the fastening device made in accordance with the invention.
FIG. 18 is a generally perspective view of a further form of a mating attachment fastener which may be employed in the invention.
FIG. 19 is a generally perspective view showing the mating attachment fastener of FIG. 18 ready for mounting on a support member (not shown) by means of the fastening device of FIG. 17.

In FIGS. 18 and 19 there is shown another application of the invention employing a slightly modified form of fastening device, designated generally at 2b, for mounting another type of attachment device 106 to a support member. In this form, the device 2b is generally similar to that shown in FIGS. 1 to 5, except that the body 100 of the device has a generally polygonal, such as rectangular, flange 104 which projects laterally outwardly therefrom and which is concave or arcuate in transverse cross section. Here again, the body 100 is provided with a generally oblate recess opening 102 and has a tip-like projection 4 extending downwardly from the base for welded securement to the support member.

The attachment device 106, in the embodiment shown, comprises a generally flat base 108 which is curved upwardly and outwardly at one end, as at 110, and then return bent upwardly and inwardly, as at 112, to provide a generally hook-shaped flanged end. The other end of the base 108 is curved upwardly and angularly outwardly, as at 114, and then is bent laterally outwardly, as at 116, to provide a generally step-shaped flange portion at such end. The base 108 is provided with a generally polygonal, such as rectangular, opening 113 disposed centrally thereof. In the form shown, the opening 113 is partially closed by an upstanding resilient bridge member 118 which is formed from the material of the base 108. The bridge member 118 is formed by a pair of spaced, oppositely disposed bridge-like side portions 119 and 120 which are connected at their opposed ends by outwardly inclined end wall portions 121 and 122 which are integrally connected to the base 108. The bridge-like side portions 119 and 120 are each provided with a series of consecutive concave depressions 124 for the reception of the corresponding flange 104 on the fastening device 2*b*. In the form shown, the bridge-like side portions 119 and 120 are spaced apart by an elongated slot 123 which extends transversely therebetween and which opens at its opposed ends onto the inclined end portions 121 and 122 of the bridge member 118. The lengthwise dimension of the slot 123 is greater than that of the body 100 of the fastening device 2*b* while the width of the slot 123 is greater than the width of the body 100 of the fastening device, but is preferably less than the maximum transverse width across the flange 104 of the device.

In a typical application of this form, the fastening device 2*b* is weldably secured to the support member by means of the tip-like projection 4 in the aforementioned manner. Thus secured, the attachment device 106 is installed by canting the base 108 so that the flange 104 of the fastener device 2*b* is received through the opening 123 between the bridge-like side portions 119 and 120 of the bridge member 118. The attachment device 106 is then rotated, such as 90°, with respect to the fastening device 2*b* so that the flange 104 lies transversely of the opening 123 with the opposed ends of the flange seated in resilient coacting engagement within the recess portions 124 of the bridge-like portions 119 and 120. During this movement, the bridge-like portions 119 and 120 are deformed outwardly to accommodate therebetween the lengthwise dimension of the body 100 of the fastening device 2*b*. This action also has the tendency due to the resilient characteristics of the bridge member 118 to draw the base 108 of the attachment device 106 down into tight gripping engagement with the support member in the installed position thereof.

From the foregoing description and accompanying drawings, it will be seen that the present invention provides a novel construction for a weldable type fastening device which in the several forms shown can be quickly and easily assembled and disassembled for mounting various types of other attachment fasteners, such as of the rotary, slide-action and other similar types, to a support member. Accordingly, it will be seen that the fastening devices of the invention can be employed with other various types of attachment devices and may themselves be produced in other modified forms without parting from the scope of the present invention.

We claim:

1. A fastening device for welded securement with a support member comprising:
   a body made from a metallic material, and
   at least one tip-like projection made from the material of said body and extending outwardly therefrom adapted for welded securement to said support member, including in combination, a separate attachment device detachably connected by the body of said fastener device for mounting on said support member by said fastener device,
   said attachment device being of a generally U-shaped configuration having a pair of spaced, oppositely disposed resilient legs extending outwardly from a bite portion, one of said legs having an opening adapted to receive the body of said fastening device therethrough, and
   the other of said legs having a depending plug-like member adapted for insertion for interlocking, coacting engagement within the interior of the body of said fastening device.

2. A fastening device in accordance with claim 1, wherein:
   the body of said fastening device is of an inverted, generally cup-shaped configuration having a recess opening therein,
   a pair of spaced, oppositely disposed lugs projecting interiorly from the body into said recess opening, and
   said lugs coacting in camming engagement with said plug-like member of said attachment device when inserted into said recess opening for holding said attachment device in mounted relation on said support member.

3. A fastening device in accordance with claim 2, wherein:
   the configuration of said plug-like member conforms in transverse shape generally to the corresponding transverse shape of the recess opening in the fastener device, and includes a pair of internal, outwardly extending lugs having a generally polygonal shape for snap-coacting interlocking engagement with the lugs on the said fastener device.

4. A fastening device in accordance with claim 1, wherein:
   said other leg is provided adjacent its free end with a box-like enclosure construction disposed in enclosing relation with respect to said plug-like member.

5. A fastening device in accordance with claim 4, wherein:
   said box-like enclosure is defined by a pair of spaced, downwardly extending sidewalls,
   said sidewalls being joined together and closed at one end by a curved terminal end wall.

6. A fastening device in accordance with claim 5, wherein:
   said plug-like member is foreshortened in length as compared to the length of said walls, and
   said side walls are co-extensive in length so as to be seated in flush engagement with the said one of said legs in the installed position of said device.

7. A fastening device in accordance with claim 1, wherein:
   said body includes a base and an endless side wall extending upwardly from said base, and
   said tip-like projection is made from the material of said base and extends outwardly therefrom.

8. A fastening device in accordance with claim 7, wherein:
   said base is inclined downwardly and outwardly in a direction away from said tip-like projection.

9. A fastening device in accordance with claim 7, wherein:
   said body is of a generally frusto-conical shape having a generally oblate recess opening defined by said side wall.

10. A fastening device in accordance with claim 1, including:
    an endless flange projecting laterally outwardly from the upper marginal edge defined by said side wall.

11. An attachment device for mounting with a support member by means of a fastening device of the type having a hollow body made from a metallic material and at least one tip-like projection extending outwardly therefrom adapted to be welded to a support member, said attachment device comprising:
    a pair of spaced, oppositely disposed resilient legs extending outwardly from an interconnecting bite portion,
    one of said legs having an opening adapted to receive said fastening device therethrough for welded securement thereof to said support member, and the other of said legs having a plug-like member extending outwardly therefrom toward the opening in said one leg adapted for interlocking coacting engagement with said fastening device.

12. A fastening device in accordance with claim 11, wherein:
said body is of a generally inverted, cup-shaped construction having a base and an endless side wall extending upwardly from said base, and
said tip-like projection made from the material of said base and extending outwardly therefrom.

13. A fastening device in accordance with claim 12, including:
an endless flange projecting laterally outwardly from the upper marginal edge defined by said side wall.

14. A fastening device in accordance with claim 11, wherein:
said base is inclined downwardly and outwardly in a direction away from said tip-like projection.

15. A fastening device in accordance with claim 11, wherein:
said body is of a generally frusto-conical shape having a generally oblate recess opening defined by said side walls.

16. A fastening device in accordance with claim 15, including:
a pair of spaced, oppositely disposed lugs projecting inwardly from said side wall and with said opening adapted for interlocking engagement with said plug-like member.

17. A fastening device for welded securement with a support member for use in connecting an attachment member to the support member comprising:
a generally inverted, cup-like shaped body made of weldable material,
said body having a base and an endless side wall extending from said base, at least one tip-like projection made from the material of said base and extending outwardly therefrom,
said base inclined downwardly and outwardly in a direction away from said tip-like projection,
said body being of a generally frusto-conical shape having a generally oblate recess opening defined by said side wall,
an endless flange projecting laterally outwardly from the upper marginal edge defined by said side wall, and
a pair of spaced, oppositely disposed lugs projecting inwardly from said endless side wall into said recess adapted for snap-action interlocking engagement with said attachment member.

18. A fastening device in accordance with claim 17, including:
a flange extending laterally outwardly adjacent the marginal edge defined by said side wall, and
said flange being upwardly and outwardly arched in a direction away from said base.

19. A fastening device in accordance with claim 18, including in combination:
a separate attachment device detachably connected by the body of said fastening device for mounting on said support member by said fastening device,
said attachment device comprising a base having an elongated slot extending therethrough,
said base including an upstanding bridge member struck upwardly from the material of said base,
said bridge member including an elongated slot extending therethrough,
said bridge member including a plurality of consecutive depressions adapted to receive the flange of said fastening device,
said depressions disposed in spaced relation lengthwise of said bridge member and extending transversely of said slot to enable selective positioning of said fastener member in a respective one of said depressions for adjustment of said attachment member with respect to said support member.

20. A fastener device in accordance with claim 19, wherein:
the lengthwise dimension of said slot is greater than the transverse dimension of said body along the major axis thereof, and
the width of said slot is greater than the corresponding width of the body of said fastening device, and less than the maximum transverse width of said endless flange.

21. A fastening device in accordance with claim 17, including in combination:
a separate attachment device detachably connected by the body of said fastening device for mounting on said support member by said fastening device,
said attachment comprising a generally U-shaped body including a resilient generally arcuate shaped base having a slot-like opening adapted to receive the body of said fastening device therethrough, and
said endless flange adapted to overlie the marginal edge portions of said opening in said base upon relative movement of said attachment device with respect to said fastening device upon installation thereof.

22. A fastening device in accordance with claim 21, wherein:
said opening is generally cruciform in shape being defined by a pair of slits disposed at right angles to one another,
one pair of said slits being crimped downwardly and outwardly adjacent their interior marginal edges defining a seat-like support for seating engagement with the said endless flange upon rotary installation of said attachment device relative to said fastening device.

23. A fastening device in accordance with claim 22 wherein:
the other of said pair of slits has a minimum transverse dimension greater than the maximum transverse dimension of said endless flange, and
said one of said slits having transverse dimensions less than the corresponding transverse dimension of said endless flange.

24. A fastening device in accordance with claim 21, wherein:
said opening is generally key-hole shaped in configuration including a generally large elongated portion adapted to slidably receive the body of said fastening device and an oblate-shaped portion conforming to the configuration of said body having the interior marginal edges crimped downwardly and inwardly defining a seat-like support for seated engagement with said endless flange upon sliding installation of said attachment device with said fastening device.

25. A fastening device in accordance with claim 21, wherein:
the transverse width of said elongated portion progressively diminishes from the end thereof remote from said oblate portion having a transverse dimension at one end greater than the transverse dimension of said endless flange, and
said oblate opening having transverse dimensions less than the corresponding transverse dimensions of said body in the installed position thereof.

26. A fastening device for welded securement with a support member comprising:
an inverted generally U-shaped body made from a metallic material having a bridge portion and a pair of laterally spaced legs extending downwardly from said bridge portion,
said bridge portion having a generally arched shape in transverse cross-section to enhance the strength characteristics of said device,
said bridge portion being bent downwardly adjacent its opposed ends to provide a pair of spaced, oppositely disposed generally vertically oriented legs, said legs being bent outwardly adjacent their ends remote from said bridge portion and extending laterally outwardly defining a pair of flanges adapted for supporting engagement with the confronting side of said support member, each of said flanges including a generally centrally oriented tip-like projection made from the material of said flanges and extending outwardly therefrom, and each of said flanges inclined downwardly and outwardly in a direction away from said tip-like projection adapted for weldable connection adjacent the opposed ends of said device to said support member.

27. A fastening device for welded securement with a support comprising:

a body made from a metallic material, said body being of a generally U-shaped configuration defined by a base having a generally polygonal configuration and a pair of spaced, oppositely disposed legs extending generally vertically outwardly from said base and being bent outwardly adjacent their opposed ends defining a pair of laterally extending flanges, said flanges being arcuate in transverse cross-section to enhance the strength characteristics of said device, said base being inclined downwardly and outwardly in a direction away from the center of said base to provide a clearance with respect to said support prior to welded securement thereto, a tip-like projection extending downwardly and centrally from said base, and said tip-like projection formed from the material of said base and adapted to be welded to said support member.

28. A metallic weld-type fastening device adapted to be welded by capacitance welding or the like to a metallic support member comprising:

a generally hollow body having a generally frusto-conical configuration in side elevation, said body including a generally resilient endless side wall defined by upwardly and outwardly inclined generally planar side portions and generally arcuate inclined end portions with said side and end portions being made integral and extending angularly upwardly and outwardly from a base, said base being angularly inclined downwardly and outwardly in a direction away from the geometric center of said body to provide a clearance with respect to said support member prior to welded securement thereto, said side wall including an integral outwardly projecting endless flange adjacent the end remote from said base to provide an overlying construction adapted for mounting with an attachment device, said side wall and flange cooperating at their juncture to define a generally elongated opening communicating with the interior of said body, a tip-like projection extending downwardly and centrally from said base, and said tip-like projection formed from the material of said base and adapted to be welded to said support member in the area beneath said base.

29. A weld-type fastening device in accordance with claim 28, wherein:

said tip-like projection extends beyond the lowermost extremity of said base, and said tip-like projection being tapered downwardly in a direction away from said base into a relatively sharp point.

References Cited

UNITED STATES PATENTS

| | | | |
|---|---|---|---|
| Re. 22,846 | 2/1947 | Morehouse | 248—74 |
| 2,065,843 | 12/1936 | Van Umm | 24—73.7 |
| 2,517,411 | 8/1950 | Patterson | 24—73.7X |
| 2,560,486 | 7/1951 | Shears | 24—73.7UX |
| 2,618,033 | 11/1952 | Tinnerman et al. | 24—73.7X |
| 3,120,938 | 2/1964 | Lucas | 24—73.7UX |
| 3,455,528 | 7/1969 | Meyer | 24—73.7X |
| 3,466,709 | 9/1969 | Brown | 24—73 |

FOREIGN PATENTS

| | | | |
|---|---|---|---|
| 1,113,634 | 12/1955 | France | 24—73.7 |
| 323,832 | 1/1930 | Great Britain | 24—73HSMF |

DONALD A. GRIFFIN, Primary Examiner